(12) United States Patent
Zojceski et al.

(10) Patent No.: US 11,491,908 B2
(45) Date of Patent: Nov. 8, 2022

(54) MATRIX LIGHTING DEVICE WITH TIME OF FLIGHT ESTIMATION

(71) Applicant: VALEO VISION, Bobigny (FR)

(72) Inventors: Zdravko Zojceski, Bobigny (FR);
Samuel Daroussin, Bobigny (FR)

(73) Assignee: VALEO VISION, Bobigny (FR)

( * ) Notice: Subject to any disclaimer, the term of this patent is extended or adjusted under 35 U.S.C. 154(b) by 24 days.

(21) Appl. No.: 17/261,464

(22) PCT Filed: Jul. 19, 2019

(86) PCT No.: PCT/EP2019/069566
§ 371 (c)(1),
(2) Date: Jan. 19, 2021

(87) PCT Pub. No.: WO2020/016435
PCT Pub. Date: Jan. 23, 2020

(65) Prior Publication Data
US 2021/0253019 A1    Aug. 19, 2021

(30) Foreign Application Priority Data

Jul. 20, 2018    (FR) ..................... 18 56766

(51) Int. Cl.
*B60Q 1/00*     (2006.01)
*F21S 41/663*   (2018.01)
(Continued)

(52) U.S. Cl.
CPC ......... *B60Q 1/0023* (2013.01); *B60Q 1/0076* (2013.01); *F21S 41/153* (2018.01);
(Continued)

(58) Field of Classification Search
CPC ... B60Q 1/0023; B60Q 1/0076; F21S 41/153; F21S 41/663; G01S 7/4815; G01S 7/4863; G01S 17/89; G01S 17/936
See application file for complete search history.

(56) References Cited

U.S. PATENT DOCUMENTS 5,680,648 A * 10/1997 Nonaka ............... G02B 7/32
396/25
11,119,198 B2 * 9/2021 Campbell ............ G01S 7/497
(Continued)

FOREIGN PATENT DOCUMENTS

DE    10 2013 002 668 A1    8/2014
WO    WO 2008/154736 A1   12/2008
WO    WO 2018/003227 A1    1/2018

OTHER PUBLICATIONS

International Search Report dated Oct. 28, 2019 in PCT/EP2019/069566 filed on Jul. 19, 2019, 2 pages.

*Primary Examiner* — Tung X Le
(74) *Attorney, Agent, or Firm* — Oblon, McClelland, Maier & Neustadt, L.L.P.

(57) ABSTRACT

The invention proposes a lighting device for a motor vehicle comprising a matrix light source that performs a lighting function within the motor vehicle. The same source is used, together with a photodiode, to estimate the time of flight of captured light pulses initially generated by the matrix source. It becomes possible to detect objects and/or gestures using light in the visible spectrum, and without having to use specific pulse sources dedicated for this purpose.

20 Claims, 1 Drawing Sheet

(51) Int. Cl.
    *F21S 41/153*     (2018.01)
    *F21V 23/04*     (2006.01)
    *G01S 7/481*     (2006.01)
    *G01S 17/10*     (2020.01)
    *F21Y 115/10*     (2016.01)

(52) U.S. Cl.
    CPC ........ *F21S 41/663* (2018.01); *F21V 23/0471* (2013.01); *G01S 7/4815* (2013.01); *G01S 17/10* (2013.01); *F21Y 2115/10* (2016.08)

(56) References Cited

U.S. PATENT DOCUMENTS

| | | |
|---|---|---|
| 2010/0191418 A1 | 7/2010 | Mimeault et al. |
| 2016/0003946 A1* | 1/2016 | Gilliland ............... G01S 7/4816 356/5.01 |
| 2016/0245919 A1* | 8/2016 | Kalscheur ............. G01S 7/4817 |
| 2018/0088215 A1 | 3/2018 | Halbritter et al. |
| 2019/0154815 A1 | 5/2019 | Oohata |
| 2019/0204422 A1* | 7/2019 | Yatskan ................ G01S 7/4816 |

* cited by examiner

MATRIX LIGHTING DEVICE WITH TIME OF FLIGHT ESTIMATION

The invention pertains to electroluminescent semiconductor element-based matrix light sources, in particular for motor vehicles. The invention relates in particular to such a source capable of detecting the presence of an object.

A light-emitting diode (LED) is an electronic component capable of emitting light when an electric current flows therethrough. The luminous intensity emitted by an LED is generally dependent on the intensity of the electric current flowing therethrough. Inter alia, an LED is characterized by a current intensity threshold value. The threshold value of the intensity of this forward current generally decreases as the temperature increases. Likewise, when an LED emits light, a voltage drop equal to its forward voltage is observed across its terminals. The value of the forward voltage depends mainly on the wavelength of the emitted light, which defines the energy of the emitted photon in eV. Generally speaking, it is possible to estimate $\lambda=1240/E$, with lambda in nanometers and E in electron volts. Therefore, the forward voltage of an LED emitting a blue light at 460 nm is at least 2.7 V, or 1.9 V for a red light at 650 nm. In other words, if the source voltage is close to the voltage $E=1240/\lambda$ this means that no regulation source is adding an additional voltage drop, and that the efficiency of the assembly is identical to a single LED, without any other driving system.

In the automotive field, LED technology is increasingly being used for numerous light signaling solutions. LEDs are used to perform lighting functions such as daytime running lights, signaling lights, etc. The usefulness of matrices of LEDs comprising a large number of elementary electroluminescent light sources is beneficial in numerous fields of application, and in particular also in the field of lighting and signaling for motor vehicles. A matrix of LEDs may be used for example to create light beam forms that are beneficial for lighting functions, such as headlights or daytime running lights. In addition, a plurality of different lighting functions may be produced using a single matrix, thus reducing the physical bulk in the restricted space of a motor vehicle headlight.

Moreover, advanced driving assistance systems are currently being developed at the time of writing of this patent. Such systems need abilities to detect objects and gestures. On the one hand, they are able to assist with driving functions, semi-autonomous or fully autonomous driving functions and with road safety. These aspects will comprise, without limitation, the ability to avoid accidents by warning the driver of any potential obstacles, or by taking control of the vehicle in order to avoid collisions. On the other hand, gesture detection systems may facilitate human/machine interaction within the passenger compartment of a motor vehicle. To perform these functions, it has been proposed to use a plurality of sensors implementing for example a LiDAR ("Light Detection and Ranging"), RADARs, or to use cameras connected to an image processing system.

LiDAR is based on the principle of estimating the time of flight of a light pulse. A measurement is taken of the time taken by the light pulse to cover its journey, which consists of two parts. The first part of the journey corresponds to the distance between the light source and an object, where the pulse is reflected. The second part of the journey corresponds to the return path, from the object in question to a sensor. If the light source and the sensor are arranged substantially at the same location, the distance D between the source/the sensor and the object in question is estimated using the equation $D = c \cdot 2 t$, t being the time taken by the pulse to perform its journey, and c representing the speed of light, that is to say $3 \cdot 10^8$ m/s. In order to be able to measure a distance of 3 m, it is necessary to be able to measure a time of flight of 20 ns with a certain degree of accuracy. Likewise, in order to be able to measure a distance of 30 m, a measurement of 200 ns is required. Known light-emitting diodes emitting white light and supplied with electric current by known driving means typically have, when turned on, a pulse rise time of the order of 1 µs to 1 ms. These LEDs clearly do not have the features to be used in a LiDAR system as has just been described. This is why dedicated red or infrared LASER diodes are typically used in LiDARs.

These sources of rapid light pulses (laser diodes) dedicated to the LiDAR function however add a significant production cost to the motor vehicles in question, and they are not able to be used for any other lighting function that is required in a motor vehicle, while they also take up additional space in the already limited volume that is available to install a vehicle headlight.

Red and infrared rays also do not make it possible to detect obstacles during weather conditions involving heavy rain, since red/infrared light is not able to penetrate water.

One aim of the invention is to overcome at least one of the problems posed by the prior art. More precisely, the invention aims to propose a lighting device able to use a light source that is used within a motor vehicle to perform a lighting function, in order also to implement an object detection system using the principle of estimating the time of flight of light pulses.

According to a first aspect of the invention, what is proposed is a lighting device for a motor vehicle. The device comprises a matrix light source having a plurality of electroluminescent semiconductor element-based elementary light sources, the matrix light source being intended to perform at least one lighting function of the motor vehicle. The device is noteworthy in that the matrix light source is voltage-driven by a supply circuit and comprises a substrate into which a plurality of switch elements are integrated, each switch element being intended to selectively connect at least one elementary source to the supply means. Furthermore, the device comprises a detector able to detect a light signal emitted by one of the elementary light sources and reflected from an object, and a processing unit operationally connected to the switch elements and intended to control the state thereof, and to process a signal detected by the detector.

The lighting function performed by the matrix light source may preferably be an external signaling function such as daytime running lights, a lighting function such as headlights, or a function for illuminating the passenger compartment of the motor vehicle.

The detector may preferably comprise at least one photodiode. The detector may preferably comprise a single photodiode.

The processing unit may preferably be configured so as to estimate the distance between the photodiode and said object, using the signal detected by said photodiode.

The processing unit may preferably comprise a delay line, involved in a constant-fraction discriminator circuit, for generating a delayed copy of a detected light signal, emitted by the matrix source and reflected by said object, and a time-of-flight measurement unit configured so as, on the basis of the signal generated by the constant-fraction discriminator circuit, to determine the time of flight of the emitted light signal between the object and the matrix source.

The switch element may preferably be connected in series with an elementary light source.

The switch element may preferably comprise an N-channel MOS metal-oxide gate field-effect transistor whose state is controlled by way of a signal applied to its gate. The signal may preferably reach processing means.

The thickness of the substrate may preferably be between 100 and 800 microns.

The supply circuit may preferably be integrated into said substrate.

The internal series resistances of each of the elementary light sources are preferably identical and between 1 and 100 ohms. They may preferably be equal to 10 ohms. The matrix light source may preferably comprise a monolithic component in which the semiconductor layers of the elementary light sources are arranged on a common substrate. As an alternative, the elementary light sources may comprise discrete light sources for which the common substrate has been separated through a cutting process so as to be reproduced in the same order using a "pick & place" process.

The luminescent semiconductor element-based elementary sources may preferably comprise sources emitting in the blue spectrum, corresponding to wavelengths of between 400 and 490 nm. The elementary light sources may preferably emit light having a wavelength substantially equal to 450 to 460 nm.

Said light signals of the blue light may preferably comprise pulses having a rise time of the order of 1 to 20 ns.

According to another aspect of the invention, what is proposed is a method for detecting an object by way of a device according to the first aspect of the invention. The method is noteworthy in that it comprises the following steps:
supplying electricity to the matrix light source,
using a control unit to sequentially control the switch elements of each elementary light source, so as to emit a sequence of light signals, each signal being emitted from the location of one of the elementary light sources;
using the detector to sequentially detect the light signal respectively reflected by an object;
for each emitted light signal, recording an item of data in a memory element, the item of data indicating whether or not an object has been detected at the location illuminated by the corresponding light signal.

Preferably, for each emitted light signal, the detector is able to record an item of data additionally indicating an estimate of the distance between the object detected or not detected at the corresponding location and the detector.

By using the proposed measures, it becomes possible to use a matrix light source of a motor vehicle, which is used for example to perform an internal or external lighting function of the motor vehicle, in an object detection system using the principle of estimating the time of flight of light pulses emitted by at least one of the elementary light sources of the matrix source. The matrix light source that is used is voltage-driven. Integrating switch elements for controlling the elementary sources of the matrix—these are for example N-MOS transistors—into the substrate itself of the matrix light source greatly reduces the turn-on response times of light-emitting diode (LED) elementary sources. Light pulses having a rise time of the order of 2 ns are thus able to be achieved, thereby making the matrix source well-suited to an object detection system using the principle of estimating the time of flight of the light pulses emitted and reflected from an object. Distances between 0.3 and 300 meters are thus able to be estimated, thereby making it possible to perform object detection functions or gesture detection functions, for example. Only a photodiode and decision/detection logic are added to the matrix source already able to be used in the motor vehicle, thereby reducing both the bulk and the production costs of the proposed system in comparison with known LiDAR solutions using dedicated pulse sources for this purpose. It is also possible, by calibrating the detection logic, to estimate the depth of various points of the detected object with respect to the light source. This makes it possible for example to detect complex manual gestures in the application of the proposed system to a human/machine interface.

Other features and advantages of the present invention will be better understood with the aid of the description of the examples and of the drawings, in which.

Figure 1:
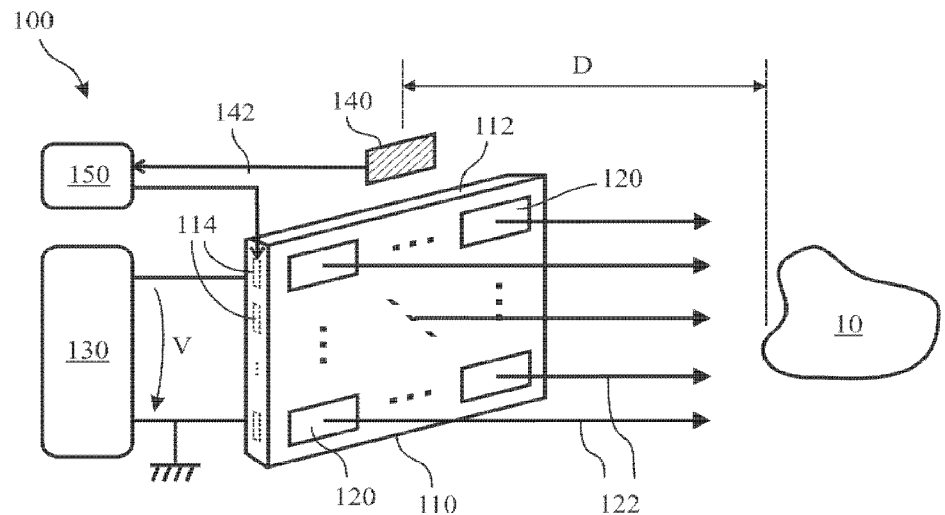
FIG. 1 shows a schematic view of a device according to one preferred embodiment of the invention.

Unless specified otherwise, technical features that are described in detail for one given embodiment may be combined with the technical features that are described in the context of other embodiments described by way of example and without limitation. Similar reference numerals will be used to describe similar concepts across various embodiments of the invention. For example, the references 100 and 200 denote two embodiments of a device according to the invention.

The description focuses on the technical elements that are required to understand the invention. Other elements that are well known in the field of lighting devices for motor vehicles and that are not linked directly to the invention will be omitted for the sake of clarity. For example, a lighting device generally comprises an optical system as well as supports for keeping the various components in place, without such details being mentioned explicitly in this description.

The illustration of FIG. 1 schematically shows a lighting device 100 for a motor vehicle according to one preferred embodiment of the invention. This is for example a device used to perform an external lighting function of the motor vehicle, such as daytime running lights or dipped headlights. As an alternative, this is a device used to perform an internal lighting function for the passenger compartment of the motor vehicle, such as a luminescent screen or an ambient illumination device. The device 100 comprises a voltage-driven matrix light source 110. The matrix source 110 comprises a plurality of elementary light sources 120. These are light-emitting diode (LED) electroluminescent semiconductor element-based elementary sources, preferably emitting in the blue visible light spectrum at wavelengths of between 400 and 490 nm. Each source may emit light 120 in a main direction. The matrix source 110 comprising the elementary sources 120 is preferably a monolithic component, the production of which will be described below. A matrix source may preferably comprise at least sixteen elementary sources, although there is nothing to prevent matrices having higher resolutions, comprising for example hundreds of elementary sources or more. The matrix source 110 comprises a substrate 112 into which there are integrated switch elements 114 that are intended to selectively connect at least one elementary source 120 to a supply circuit 130. A switch element 114 is preferably arranged below the corresponding elementary source 120. These are for example N-channel metal-oxide gate field-effect (N-MOS) transistors, controlled by way of a signal applied to their respective gates. By way of example, if the substrate 112 has a thickness of around 100 to 800 microns, the last 10 to 20 microns in terms of depth close to the elementary sources 120 are reserved for the integration of the switch elements.

This closeness between the switches and the elementary sources 120 allows very short response times when turning on an elementary source, and makes it possible to achieve a required rise time of the order of 2 ns. The device 100 also comprises detection means 140 intended to detect a light signal 12 emitted by one of the elementary sources 120, and reflected by an object 10 illuminated by the light source in question. The detection means or, in an equivalent manner, the detector 140 comprise for example at least one photodiode. Just one photodiode is preferably used. It is advantageous to arrange the photodiode substantially in the same plane as the elementary sources 120, such that the distance between the elementary sources and an illuminated object 10 is substantially equal to the distance between the photodiode and the same object. The detection means 140 are operationally connected to a processing unit 150 configured so as to process signals 142 detected by the detection means 140. The processing unit is for example formed by a microcontroller element programmed for this purpose, or by an analog circuit performing the required functionality. To perform a LiDAR function, the processing unit 150 is also designed to control the state of the switch elements 114. When an elementary source is turned on for a brief time interval by actuating the corresponding switch 114, a nanosecond or picosecond timer is launched in the processing unit. This timer is stopped as soon as a signal 142 is detected by the detector 140. The timer therefore gives an estimate of the time of flight of the light pulse thus generated, and therefore makes it possible to evaluate the distance D between the matrix source/the photodiode and the object 10 that reflected the light pulse 122.

To create the white light for a lighting function from blue light, use is typically made of a layer of yellow phosphorus or of a quantum dot converter. However, this white light typically has a delay greater than 20 ns, thereby making it unsuitable for the object detection function. The detection system therefore mainly uses blue rays that have not been converted into white light. It is typically estimated that around ⅓ to ½ of the photons from the light source are not converted by the layer of phosphorus.

The voltage source 130 is produced for example by way of a converter circuit that converts an input voltage Vcc supplied by a battery internal to the motor vehicle into a voltage V suitable for supplying the matrix light source 110. Such converter circuits are known in the art, and their operation will not be described in detail in the context of the present invention.

The matrix light source 110 is preferably a monolithic component in which the semiconductor layers of the elementary light sources 120 are arranged on a common substrate 112. The matrix light source 110 preferably comprises a parallel assembly of a plurality of branches, each branch comprising electroluminescent semiconductor light sources 120.

By way of example and without limitation, the matrix light source 110 comprises, along the thickness of the substrate and starting at the end opposite the location of the elementary sources 10, a first electrically conductive layer deposited on an electrically insulating substrate. This is followed by an n-doped semiconductor layer whose thickness is between 0.1 and 2 µm. This thickness is much smaller than that of known light-emitting diodes, for which the corresponding layer has a thickness of the order of 1 to 2 µm. The following layer is the active quantum well layer having a thickness of around 30 nm, followed by an electron-blocking layer, and finally a p-doped semiconductor layer, the latter having a thickness of around 300 nm. Preferably, the first layer is an (Al)GaN:Si layer, the second layer is an n-GaN:Si layer, and the active layer comprises quantum wells made of InGaN alternating with barriers made of GaN. The blocking layer is preferably made of AlGaN:Mg and the p-doped layer is preferably made of p-GaN:Mg. n-doped gallium nitride has a resistivity of 0.0005 ohm/cm, whereas p-doped gallium nitride has a resistivity of 1 ohm/cm. The thicknesses of the proposed layers make it possible in particular to increase the internal series resistance of the elementary source, while at the same time significantly reducing its manufacturing time, as the n-doped layer is not as thick in comparison with known LEDs and requires a shorter deposition time. By way of example, a time of 5 hours is typically required for MOCVD depositions for a standard-configuration LED with 2 µm of n layer, and this time may be reduced by 50% if the thickness of the n layer is reduced to 0.2 µm.

In order to achieve elementary light sources 120 having semiconductor layers having homogeneous thicknesses, the monolithic component 110 is preferably manufactured by depositing the layers homogeneously and uniformly over at least part of the surface of the substrate so as to cover it. The layers are deposited for example using a metal oxide chemical vapor deposition (MOCVD) method. Such methods and reactors for implementing them are known for depositing semiconductor layers on a substrate, for example from patent documents WO 2010/072380 A1 or WO 01/46498 A1. Details on their implementation will therefore not be described in the context of the present invention. The layers thus formed are then pixelated. By way of example and without limitation, the layers are removed using known lithographic methods and by etching at the sites that subsequently correspond to the spaces between the elementary light sources 120 on the substrate. A plurality of several tens or hundreds or thousands of pixels 120 having a surface area smaller than one square millimeter for each individual pixel, and having a total surface area greater than 2 square millimeters, having semiconductor layers with homogeneous thicknesses, and therefore having homogeneous and high internal series resistances, are thus able to be produced on the substrate of a matrix light source 110. Generally speaking, the more the size of each LED pixel decreases, the more its series resistance increases, and the more this pixel is able to be driven by a voltage source. As an alternative, the substrate comprising the deposited layers covering at least part of the surface of the substrate is sawn or divided into elementary light sources, each of the elementary light sources having similar characteristics in terms of their internal series resistance.

The embodiment that has just been described is not limiting, and the invention pertains in the same way to types of semiconductor element-based elementary light sources involving other semiconductor layer configurations. In particular the substrates, the semiconductor materials of the layers, the layout of the layers, their thicknesses and any vias between the layers may be different from the example that has just been described, as long as the structure of the semiconductor layers is such that the internal series resistance of the elementary light source resulting therefrom is at least 1 ohm, and preferably at least 5 or 10 ohms, or else between 1 and 100 ohms.

Preferably, not only the switch elements 114 but also the supply circuit 130 may be integrated into the substrate 112 when the monolithic component 110 is manufactured.

Figure 2:
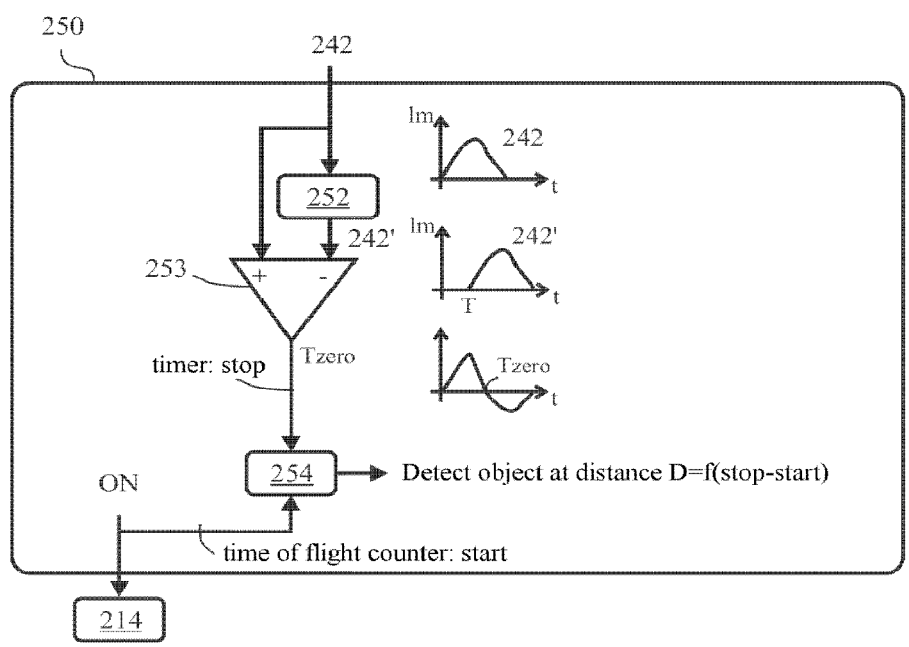
FIG. 2 shows a schematic view of a detail of a device according to one preferred embodiment of the invention.

FIG. 2 schematically shows a detail of a lighting device 200 according to one embodiment of the invention. The components that are not illustrated are identical to the components described in the context of the embodiment illustrated by FIG. 2. In this case, a non-limiting description is given of one exemplary embodiment of the processing unit 250, connected firstly to the switch elements 214 and secondly to the detection means by way of the detected signal 242. The processing means 250 are configured so as to control the state of one of the switches 214 such that the elementary source connected thereto will emit a light pulse 222 in the direction of the object to be detected.

The profile of the light signal reflected by the object, for example a pulse having a rise time of the order of 1 to 20 ns, 242, is known to the processing means. In principle, the profile is similar to the pulse initially emitted by the matrix source. However, the amplitude of the detected pulse is in practice different from the amplitude of the emitted pulse. A version, delayed by a duration T, of the signal 242 is generated; this is the signal 242'. This is performed for example by way of a delay line 252. Corresponding electronic circuits are known in the art, and will not be described in the context of the present invention. The duration T, counted from the start of the emitted pulse, corresponds to a fraction of the maximum amplitude of the emitted pulse. T is chosen for example to correspond to an amplitude value of the pulse equivalent to 50% of its maximum amplitude. Other choices are possible. A differential amplifier circuit 253 uses, at input, the signal 242 received by the detector and possibly attenuated by a circuit, not illustrated, and the delayed signal 242'. The differential amplifier makes it possible to achieve bipolar shaping of the signal, the zero crossing of which does not depend on the amplitude of the detected signal. This makes it possible to obtain a signal whose timing does not depend on the amplitude of the detected signal. This type of circuit is known in the literature as a CFD "Constant Fraction Discriminator".

The amplitude of the signal detected at the time that corresponds to the zero crossing of the signal from the CFD makes it possible to calculate the time of flight of the light pulse. Specifically, at this time, the amplitude of the detected signal has reached the fraction corresponding to the fraction determined by the duration T (for example 50%) of its maximum amplitude. It may then be concluded that the rising edge of the reflected signal has been successfully detected.

The measurement of the time of flight between the start of the rising edge of the emitted light pulse and the detection of the time at which the signal from the circuit crosses zero using a TAC (time-to-amplitude converter) and/or TDC (time-to-digital converter) device makes it possible to obtain the distance D between an object that reflected the light pulse and the source of the pulse. This makes it possible to detect an object located at the distance D. By using a plurality of signals from the pixelated light source, it is possible to implement detection with finer granularity, and it becomes possible to determine the exact distance at which the object is located. By using digitization of the amplitude corresponding to the time of flight, for example, it becomes possible to determine that the object is located between a distance D1 (corresponding to a signal delayed by a duration T1) and a distance D2 (corresponding to a signal delayed by a duration T2 slightly longer than T1), or the distance difference corresponds to the resolution of the amplitude/time conversion.

Other implementations of the processing unit 250 and of the delay line 252 and of the detection circuit may be contemplated as long as they make it possible to implement the functionality that has just been described without otherwise departing from the scope of the present invention.

In all of the embodiments, the plurality of elementary light sources 120 illustrated by FIG. 1 may be used to sequentially scan the field of illumination of the matrix source 110. For each elementary source or pixel, sequentially, a light pulse is generated and the corresponding delayed signal is detected by the detection means and then processed as described in the context of the example given by FIG. 2. The information on the detection or lack of detection of an object at a certain predetermined distance is then stored in a data file or in a memory element and correlated with the respective position of the elementary light source or of the corresponding pixel. This results in a matrix-based or pixelated representation of the detected object, which representation may be used as input for other image processing algorithms that may be involved in safety systems or human/machine interface systems implemented within the computer system of the invention. Likewise, repeatedly scanning an object makes it possible to reveal movements of an object, and to detect gestures performed at a predetermined distance from the matrix source. Using the structural and functional description that has just been provided, a person having general knowledge in the field will in particular be able to produce a computer program or a control unit performing the scanning and storage function without the need to exercise additional inventive skill.

The scope of protection is defined by the following claims.

The invention claimed is:

1. A lighting device for a motor vehicle, the lighting device comprising:
   a matrix light source having a plurality of electroluminescent semiconductor element-based elementary light sources, the matrix light source being configured to perform at least one lighting function of the motor vehicle, wherein the matrix light source is voltage-driven by a supply circuit and includes a substrate in which a plurality of switch elements are integrated, each switch element being configured to selectively connect at least one elementary source to the supply circuit;
   a detector configured to detect a light signal emitted by one of the elementary light sources and reflected from an object;
   processing circuitry operationally connected to the switch elements and configured to control a state thereof, and process a signal output by the detector, wherein the processing circuity is further configured to generate a delayed copy, delayed by a duration T, of the detected light signal, emitted by the matrix light source and reflected by the object; and
   time-of-flight measurement circuitry configured to calculate a time of flight of the emitted light signal between the object and the matrix source so as to estimate a distance to the object.

2. The device as claimed in claim 1, wherein the detector comprises a photodiode.

3. The device as claimed in claim 2, wherein the processing circuitry is further configured to estimate the distance, using the detected signal, which is detected by the photodiode of the detector.

4. The device as claimed in claim 2, wherein the processing circuitry further comprises a delay line, in a constant-fraction discriminator circuit, and is configured to generate the delayed copy of the detected light signal, emitted by the matrix source and reflected by said object, and the time-of-flight measurement circuitry is further configured to, based on the signal generated by the constant-fraction discriminator circuit, determine the time of flight of the emitted light signal between the object and the matrix source.

5. The device as claimed in claim 2, wherein each switch element is connected in series with one of the elementary light sources.

6. The device as claimed in claim 2, wherein each switch element comprises an N-channel MOS metal-oxide gate field-effect transistor whose state is controlled by a signal applied to a gate of the field-effect transistor.

7. The device as claimed in claim 2, wherein a thickness of the substrate is between 100 and 800 microns.

8. The device as claimed in claim 2, wherein said supply circuit is integrated into said substrate.

9. The device as claimed in claim 1, wherein the processing circuitry is further configured to estimate the distance, using the detected signal, which is detected by the photodiode of the detector.

10. The device as claimed in claim 1, wherein the processing circuitry further comprises a delay line, in a constant-fraction discriminator circuit, and is configured to generate the delayed copy of the detected light signal, emitted by the matrix source and reflected by said object, and
the time-of-flight measurement circuitry is further configured to, based on the signal generated by the constant-fraction discriminator circuit, determine the time of flight of the emitted light signal between the object and the matrix source.

11. The device as claimed in claim 1, wherein each switch element is connected in series with one of the elementary light sources.

12. The device as claimed in claim 1, wherein the switch element comprises an N-channel MOS metal-oxide gate field-effect transistor whose state is controlled by a signal applied to a gate of the field-effect transistor.

13. The device as claimed in claim 1, wherein a thickness of the substrate is between 100 and 800 microns.

14. The device as claimed in claim 1, wherein said supply circuit is integrated into said substrate.

15. The device as claimed in claim 1, wherein internal series resistances of each of the elementary light sources are identical and between 1 and 100 ohms.

16. The device as claimed in claim 1, wherein the matrix light source comprises a monolithic component in which semiconductor layers of the elementary light sources are arranged on the substrate.

17. The device as claimed in claim 1, wherein each of the electroluminescent semiconductor element-based elementary sources comprise sources emitting in a blue spectrum, corresponding to wavelengths of between 400 and 490 nm.

18. The device as claimed in claim 1, wherein said light signal comprises pulses having a rise time of less than 20 ns.

19. A method for detecting an object by way of the lighting device as claimed in claim 1, wherein the method comprises:
supplying electricity to the matrix light source,
using the processing circuitry to sequentially control the switch elements of each elementary light source, so as to emit a sequence of light signals, each light signal being emitted from a location of one of the elementary light sources;
using the detector to sequentially detect the light signal respectively reflected by the object;
for each emitted light signal, recording an item of data in a memory, the item of data indicating whether or not the object was detected at the location illuminated by the corresponding light signal.

20. The method as claimed in claim 19, wherein, for each emitted light signal, the processing circuitry is further configured to record an item of data additionally indicating an estimate of the distance the object detected or not detected at the corresponding location and the detector.

* * * * *